Nov. 10, 1964　　　　W. J. LINN　　　　3,156,226
AIR INTAKE FITTING FOR INTERNAL COMBUSTION ENGINE
Filed May 23, 1963

INVENTOR
WILLIAM J. LINN
By Christy, Carmele, & Strickland
Attorneys

United States Patent Office 3,156,226
Patented Nov. 10, 1964

1

3,156,226
AIR INTAKE FITTING FOR INTERNAL
COMBUSTION ENGINE
William J. Linn, 1373 N. Sheridan Ave., Pittsburgh, Pa.
Filed May 23, 1963, Ser. No. 282,717
2 Claims. (Cl. 123—119)

This invention relates to internal combustion engines utilizing carburetors, and is for a device for modulating the intake manifold pressure according to variations in the load conditions or speed changes in engine operation. Its purpose is to reduce fumes resulting from unburned gases and effect fuel economy and improve engine performance. It is a modification of the invention disclosed in my U.S. Patent No. 3,059,628, granted October 23, 1962. This application is a continuation-in-part of my copending application Serial No. 221,631, filed September 5, 1962.

When an internal combustion engine, typically an automobile engine is operating there is a negative pressure or vacuum in the intake manifold which fluctuates widely with variations in speed and load conditions. For example, when an automobile is operating in traffic, the engine may be idling with the throttle plate closed and with a moderate degree of vacuum in the intake manifold. If traffic then suddenly moves, the throttle may be quickly opened and the engine speeded up. Then the throttle may be again suddenly closed and the inertia of the engine will create a high vacuum in the manifold, leading to an excessive flow of gasoline with an inadequate supply of air, resulting in only partial oxidation of the fuel and a waste of fuel.

In my U.S. Patent No. 3,059,528, I have disclosed a system for removing waste gases from the crank case or breather along with atmospheric air to partly relieve conditions resulting from such changes in pressure in the intake manifold. However, I have discovered that crank case gases can be better disposed of by the arrangement shown in my copending application Serial No. 173,387, filed February 15, 1962, and now abandoned, wherein such gases are led to the air intake of the carburetor. This latter mentioned application, however, is ineffective to alleviate the objects above referred to.

According to the present invention I provide a fitting comprising a venturi through which atmospheric air alone is inducted into the air intake manifold of the engine between the engine and the carburetor. This fitting will provide definitely improved performance even if used alone, but is desirably used in connection with the arrangement disclosed in said application Serial No. 173,-387 for reducing the overall production of engine smoke and objectionable gases. In some cases two or more of such fittings may be used.

The invention has for a principal object to provide an attachment or fitment of simple economical construction for application to an internal combustion intake between the carburetor and engine cylinders for modifying or reducing the undesirable effects of suction or negative pressure variations in the intake manifold and giving improved fuel economy and engine performance.

Another object is to provide an air intake fitting for supplying air into an intake manifold between the carburetor and engine cylinders which is noiseless in operation, and which eliminates engine backfires.

A further object is the provision of an air intake fitting which is designed to separate dirt or solids from the ambient air as it is passed into the fitting.

The invention may be more fully understood by reference to the accompanying drawings, in which.

Figure 1:
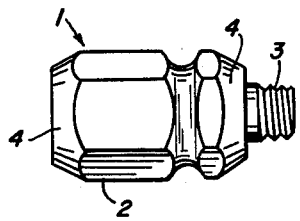
FIG. 1 is an elevation of the fitment detached from the engine.
Figure 2:
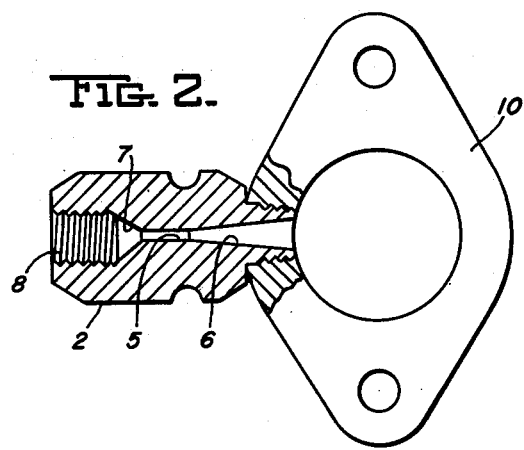
FIG. 2 is a longitudinal section through the device shown in FIG. 1, the section being in the plane of line II—II of FIG. 1 and showing the fitment screwed into a piece at the base of the carburetor.
Figure 3:
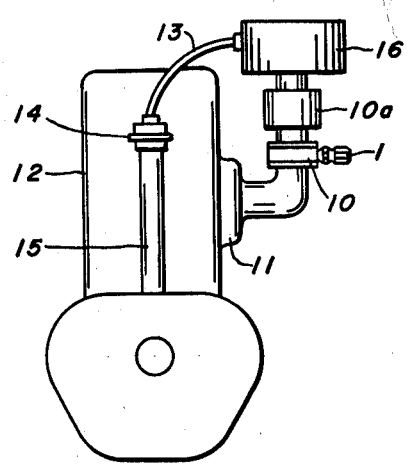
FIG. 3 is a schematic view showing the relation of this device to the engine along with the arrangement shown in my application Serial No. 173,387.

Referring first to FIGS. 1 and 2, the device preferably comprises unit 1 comprising an integral body having a central portion 2 of hexagonal or non-circular shape to facilitate the application of a wrench thereto. At one end it has a reduced exteriorly threaded nipple 3. Both ends of the main body may be champfered as indicated at 4 to eliminate sharp corners.

Extending through the body and nipple is a contoured passage shaped to form a true venturi, there being a central or middle section 5 of minimum diameter, this section of the passage being of uniform diameter from end to end and the length of this portion of the passage is greater than the diameter of the passage. At the discharge end of the middle section the walls of the opening diverge at smooth gradual angles to the end of the nipple, this inner end portion of the passage being designated 6. It is longer than the portion 5 and at the outer end its diameter is about twice the minimum diameter of portion 5.

At the other end of the cylindrical middle passage 5 the passage flares out at 7 and a steep angle of the order of 45° into a cylindrical entering passage 8 of a diameter about as large as the maximum diameter of the passage at the opposite end; that is, about twice the diameter of the middle portion 5 of the passage. The interior of the portion 8 of the passage is internally threaded or otherwise provided with a series of ridges and valleys.

In use a threaded hole is tapped into the intake manifold and the nipple 3 of the fitment is screwed tightly into this hole. With average smaller engines this hole may be tapped through flange 10 where the manifold 11 bolts onto the bottom of the downdraft carburetor 10a, below the throttle plate where the carburetted air enters the manifold. However, in large engines two or more of these fitments may be provided at spaced intervals along the manifold.

As indicated above, I prefer to use the fitment with an engine 12 having a sealed crank case with a tube 13 having a trap arrangement 14 at the top of the oil filler tube 15, this tube leading into the air cleaner 16, as described in my said application Serial No. 173,387.

In use the fitment provides a passage through which atmospheric air may enter the manifold between the carburetor and the engine. The carburetor is adjusted to idle with the fitment in place so that some atmospheric air is inducted through the fitment, increasing the air to fuel ratio beyond the throttle. Under idling conditions this inflow of air will normally be relatively small but it will be found that the engine will idle well with a leaner mixture. If the engine is speeded up the rate of air inflow through the fitment will naturally increase. If the throttle is then closed, as in the instance above noted, or where the automobile is going down grade and the throttle is closed, there may be sudden great increases in suction in the manifold. Air entering through the venturi will rapidly relieve this suction and the manifold pressure will be restored to a normal without "hunting"; that is, without going past a normal level and then returning as it now does.

It would be supposed that a straight hole might be provided in place of this fitment but this is not so. Under normal idling conditions a small hole might pass sufficient air, but a hole small enough to give proper performance under these conditions would be too small for conditions above described, such as going down grade with the throttle closed or nearly closed or driving in traffic where there are short spurts with the throttle open followed by quick closing. A venturi, on the other hand, will give a much greater increase in the amount of air that it will pass in comparison with a straight hole with each increment of pressure drop in the manifold. The increase in air flow through a venturi will not be a uniform curve but will rise abruptly with a decrease in pressure in the manifold. Consequently, the venturi permits a limited influx of air to the manifold under normal idling, but will supply a great quantity where there is a sudden increase in vacuum in the manifold. In other words, it functions in a manner roughly comparable to a valve that provides a normally restricted flow but which can be opened to provide increased flow as the vacuum increases. An imperfect venturi could be used but a true one will provide much better performance.

The fitment here shown is about 1¼" in overall length and the minimum diameter of the bore is about ³⁄₃₂", and is satisfactory for most ordinary automobile engines, but the optimum dimensions or number of these devices for larger engines must be determined by test, perferably by using a suction gauge on the manifold, as may be readily determined by one skilled in the art. Where a single device is used it is preferably installed as here shown close to the outlet side of the carburetor so that the incoming air will most effectively contact raw or wet gas that flows into the manifold as when the throttle plate is suddenly closed. With larger engines one may be placed at this location and one or more where the air flow may have a relatively lower velocity or where liquid fuel may tend to accumulate, such as near the ends of the manifold most remote from the carburetor.

Figure 6:
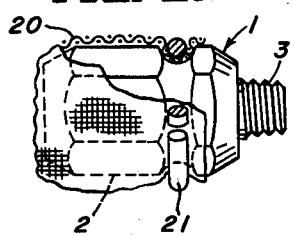
FIG. 6 is an elevation similar to FIG. 1 showing a replaceable screen over the inlet end of one embodiment of the device.

I prefer also to have a removable and replaceable terminal over the entering end of the fitment. It is here shown in FIG. 6 as a cup-shaped body 20 of fine wire mesh having an expansible wire loop 21 at the free edge which may be retained in an annular groove 22 in the main body portion, as shown in FIG. 6.

Figure 4:
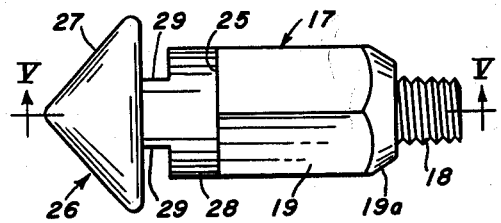
FIG. 4 is an elevation of a modification of the device showing a removable terminal member over the inlet end of the device.
Figure 5:
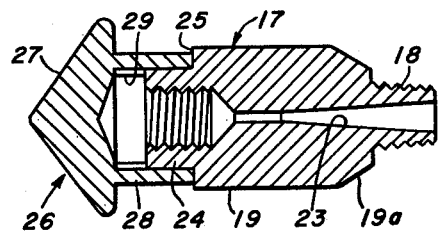
FIG. 5 is a longitudinal sectional view of the device taken along line V—V of FIG. 4.

The fitment illustrated in FIGS. 4 and 5 is a modification of the device shown in FIGS. 1, 2, 3 and 6. In this embodiment a fitting 17 is shaped at its outlet the same as the fitting 1 of FIGS. 1, 2, 3 and 6; that is, an externally threaded nipple 18 extends from a body central portion 19 which may be champfered at one end as indicated at 19a. Extending through the central portion and the nipple is a contoured passage 23 shaped to form a true venturi. The venturi is formed just as explained in reference to the modification of FIGS. 1, 2, 3 and 6. At the inlet portion 24, the body portion is reduced in diameter to form a cylindrical external wall with a shoulder 25 at its end joining the hexagonal body portion.

A cap 26 with a head 27 of conical shape has a hollow sleeve 28 extending therefrom coaxial with the axis of revolution of the conical head. The sleeve 28 is of a length greater than the length of the tubular inlet portion 24 of the fitting 17 over which it is received. Diametrically opposed ports 29 are provided through the sleeve 28 in that portion of its length between the terminal of the inlet portion 24 and the head 27 of the cap, these ports comprising peripherally-elongated slots.

The edge of the conical head 27 is rounded and its nose or point is somewhat flattened to streamline the head. The passage of air into the passage 23 of the fitting 17 is from a path of onrushing air directed against the nose of the conical head which is deflected outwardly by the sloped conical wall, and finally around the smooth or rounded edge of the head at the base of the conical shape and into the ports 29. The rounded edge obviates air turbulence which is undersirable from the standpoints that turbulent air produces a whistling noise, and solids are caught up in the turbulent air flow and introduced into the fitting. By the provision of the rounded edge, most of the solids in the air, particularly heavier particles are deflected by the conical head outwardly and carried in a divergent trajectory past the ports 29, while part of the air follows around the curved edge into the ports. In most cases the conical nose is directed toward the fan at the front of the engine, since it can be most readily adapted to such a position, and here, of course, the conical nose or shield is most important.

Since the device aids in securing better combustion of fuel it complements the connection 13 for passing crank case gases to the air intake, thereby decreasing engine fumes and smoke, and, since it is below the throttle plate while the connection 13 is in the air filter above the carburetor, this device admits required additional air when the closed throttle trends to retard flow of gases from the crank case, thus leaving out the "blow-by" gases at a time when connection 13 is least effective to dispose of them.

The internal threads or riffles at the inlet end 8 of the passage impart turbulence to the entering clean air and substantially eliminates any hissing, and aids in the reduction of reverberatory sounds and all whistling noise. An important advantage arising from the use of this device, particularly where it is used on vehicles such as trucks where unburnt fuel mixes with air in the exhaust and backfires, especially when the vehicle is going downhill, is that it will eliminate this backfiring in most instances. I have installed it on several trucks which had a tendency to backfire frequently, and in all cases the drivers have reported a complete elimination of the backfiring.

While I have shown and particularly described two preferred embodiments of my invention, it will be understood that the invention is not limited to the precise form and construction here shown.

I claim:

1. A fitment for use on an internal combustion engine intake manifold wherein the engine is of the type having a carburetor with a throttle for controlling the flow of air therethrough in which air and fuel are mixed for passage through the manifold of the engine, said fitment comprising an elongated body having an axially-extending passage therethrough, said body having an outlet end for attaching it to an opening in the intake manifold and an entering end through which air is admitted to the passage, the passage defining a venturi with the passage in the outer end being of larger diameter and reduced between the ends to a smaller cylindrical bore and then enlarged toward the outlet end on a gradual taper, the body having a conical head over the entering end of the passage and spaced from the end of the passage, the head having a sleeve portion of smaller diameter at its rear that connects the head to the body, the sleeve portion having a plurality of peripherally-elongated slot-like openings extending through it for the flow of air from behind the conical head radially through the sleeve portion into the entering end of the passage, the conical head pointing away from the elongated body.

2. A fitment for use on internal combustion engines as defined in claim 1 wherein the periphery of the conical head is rounded.

References Cited in the file of this patent

UNITED STATES PATENTS

| 1,214,322 | Kirby | Jan. 30, 1917 |
| 1,657,663 | Devereaux | Jan. 31, 1928 |
| 1,662,101 | Bossi | Mar. 13, 1928 |
| 2,612,150 | Alward | Sept. 30, 1952 |

FOREIGN PATENTS

| 97,313 | Austria | June 25, 1924 |
| 100,280 | Switzerland | July 16, 1923 |
| 100,282 | Switzerland | July 16, 1923 |